May 1, 1962 A. SMITH ET AL 3,031,830
LAWN EDGER
Filed Jan. 8, 1958 3 Sheets-Sheet 1

INVENTORS
ALEXANDER SMITH
BURTON D. BAGGS, JR.
BY A. Yater Dowell
ATTORNEY

May 1, 1962  A. SMITH ET AL  3,031,830
LAWN EDGER
Filed Jan. 8, 1958  3 Sheets-Sheet 2
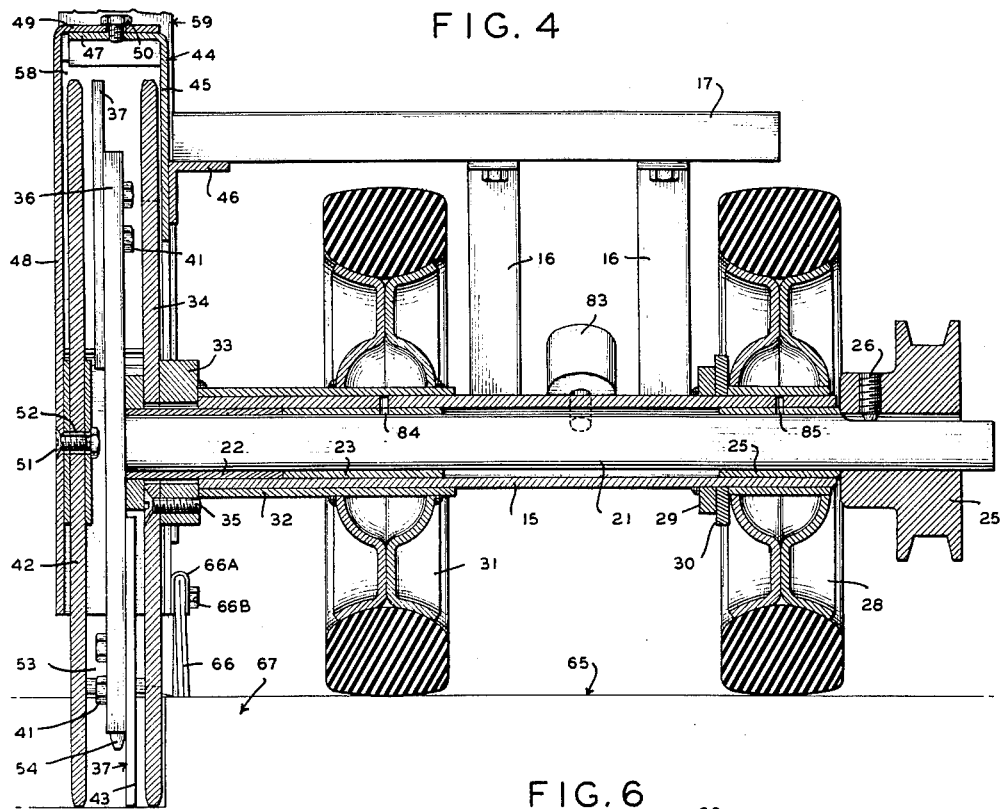
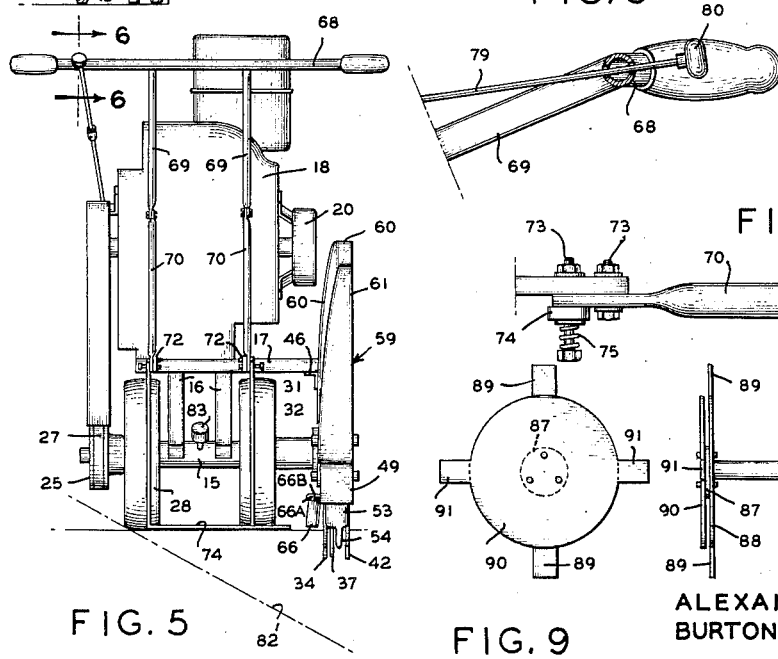
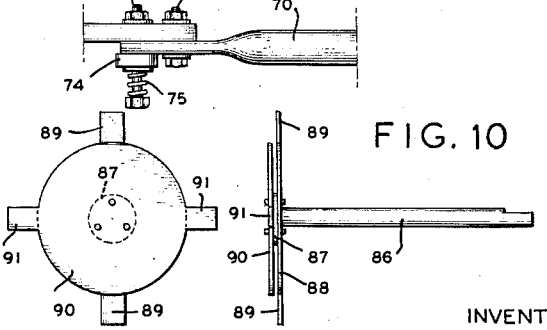
INVENTORS
ALEXANDER SMITH
BURTON D. BAGGS, JR.
BY
ATTORNEY May 1, 1962  A. SMITH ET AL  3,031,830
LAWN EDGER
Filed Jan. 8, 1958  3 Sheets-Sheet 3
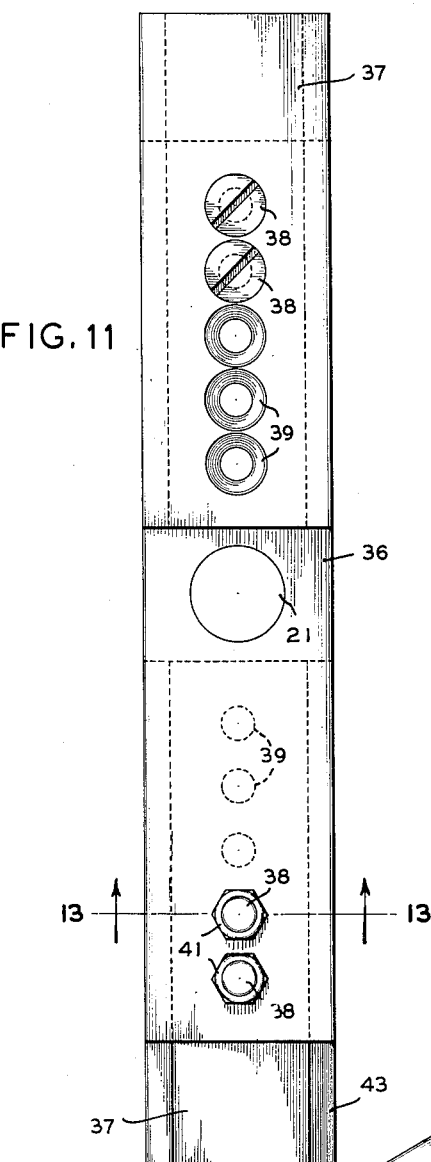
FIG. 11
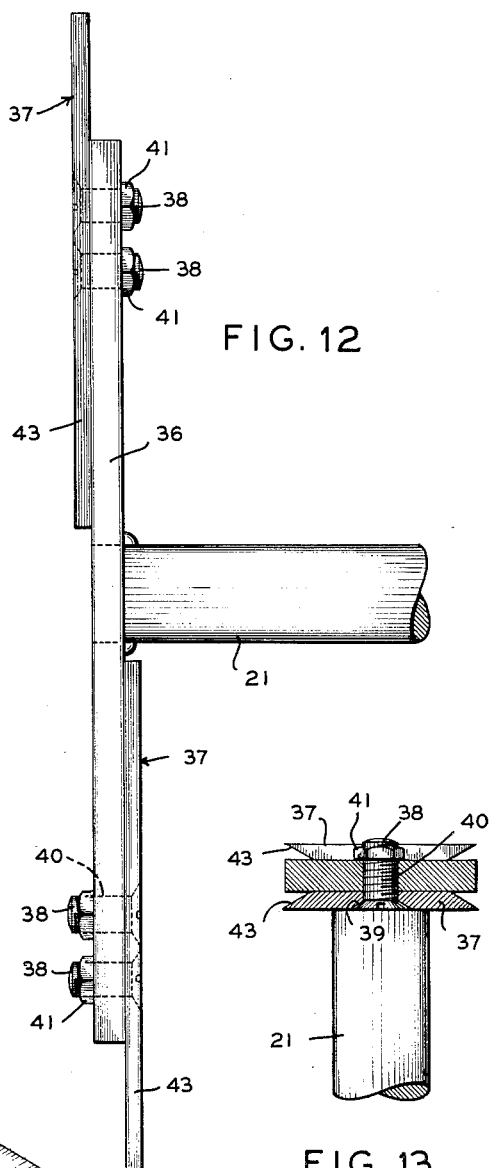
FIG. 12
FIG. 13
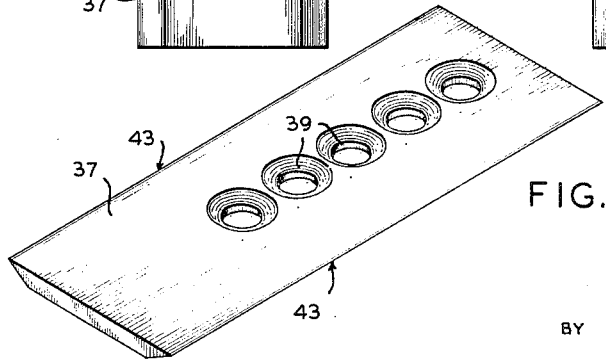
FIG. 14
INVENTORS
ALEXANDER SMITH
BURTON D. BAGGS, JR.
BY *A. Yates Dowell*
ATTORNEY

United States Patent Office 3,031,830
Patented May 1, 1962

3,031,830
LAWN EDGER
Alexander Smith, Box 1460, and Burton D. Baggs, Jr., 2429 Laurel Ave., both of Sanford, Fla.
Filed Jan. 8, 1958, Ser. No. 707,823
17 Claims. (Cl. 56—25.4)

The present invention relates to gardening and more particularly to trimming vegetation adjacent sidewalks, curbs, or the edge of gardens to provide an attractive and neat appearance. The present invention is a further development of my prior applications for patent on lawn edging equipment.

Equipment heretofore used for obtaining a neat cut edge in a garden has not been entirely satisfactory particularly in regard to the objectionable throwing of cuttings and stones by the cutting elements particularly where such cutting elements were power driven. Also, the prior devices have been extremely heavy and cumbersome to operate and guide and the operators have had to be highly skilled to obtain satisfactory results.

An object of the present invention is to provide a lawn trimmer and edger which overcomes the difficulties of the prior art devices and serves to evenly trim the edges of lawns close to obstructions and which is safe to operate.

A further object is to provide gardening equipment having guarding disks and guarding sheets around a powerdriven cutting element to protect the operator from flying cuttings or stones.

A further object is to provide a light-weight highly efficient trimming device which can be easily transported and can be easily moved from place to place in the manner of a wheelbarrow.

Figure 1:
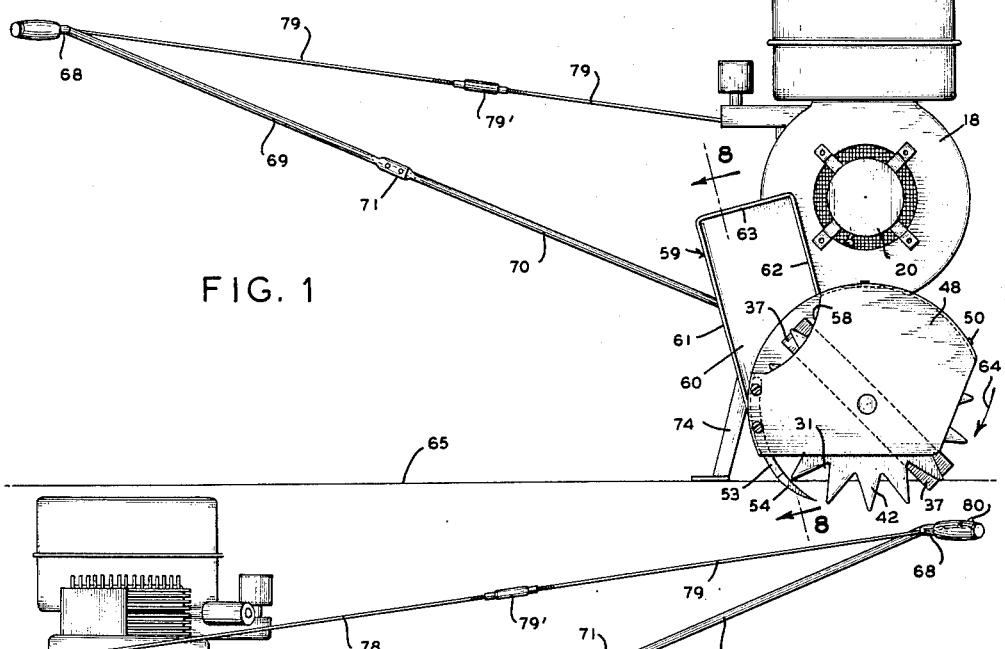
Figure 2:
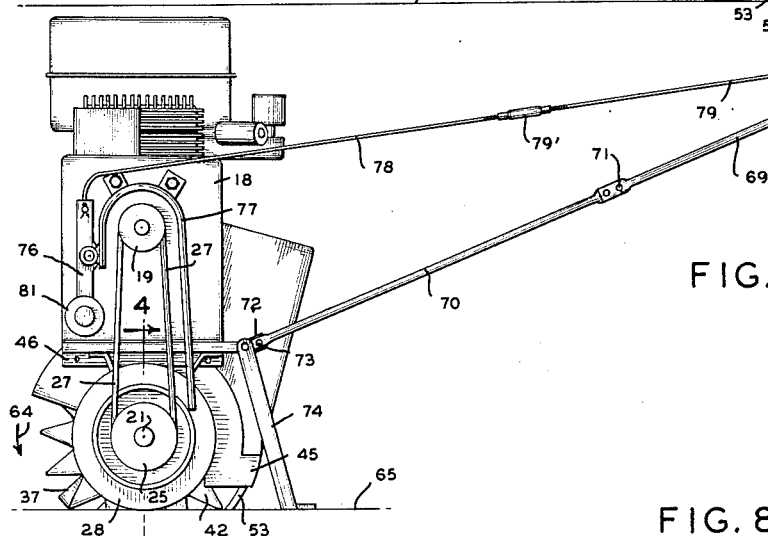
Figure 3:
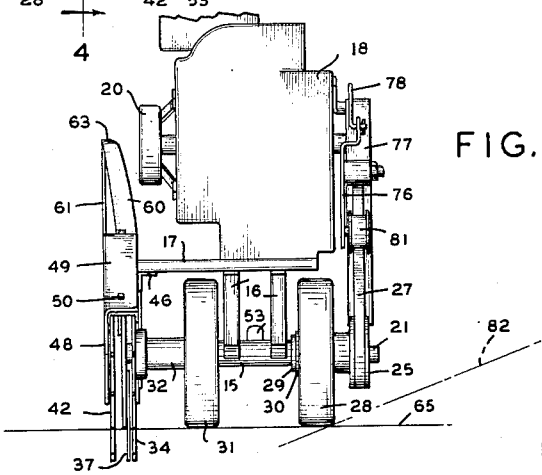
Figure 8:
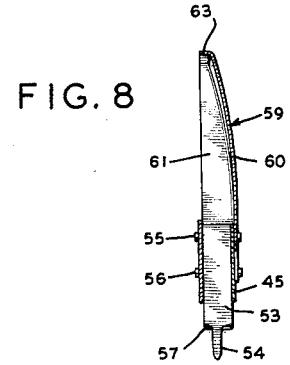

Other and further objects will be apparent as the description proceeds and by reference to the accompanying drawings wherein:

FIG. 1 is a right side elevation of the power driven lawn edging machine showing the cutter, guarding disks and cutting directing chute in the normal operative position;

FIG. 2, a left side elevation of the lawn edger showing the belt drive and belt tightener arrangement;

FIG. 3, a front elevation of the lawn edger with parts omitted for simplicity;

FIG. 4, an enlarged section taken substantially on line 4—4 of FIG. 2 showing the wheel-supporting structure, the chassis and the cutter with the guarding disks and guarding sheets;

FIG. 5, a rear elevation of the lawn edger showing the handle in its rest position and the stand for supporting the machine while the machine is out of use;

FIG. 6, an enlarged detailed section taken substantially on line 6—6 of FIG. 5 showing the belt tightening operating rod;

FIG. 7, a fragmentary detail showing the connection of the handle to the chassis and the mounting of the stand;

FIG. 8, a section taken substantially on line 8—8 of FIG. 1 showing the cuttings directing chute and the protecting guard prong;

FIG. 9, an end elevation of a modified form of cutter mounted on the tool carrying shaft;

FIG. 10, a side elevation of the cutter and tool carrying shaft of FIG. 9;

FIG. 11, an enlarged end elevation of the form of cutter and tool carrying shaft shown in the other figures;

FIG. 12, a side elevation of the cutter mounted on the cutter support plate fixed to the tool carrying shaft;

FIG. 13, a section taken substantially on line 13—13 of FIG. 11 showing the cutter blades with their sharpened edges outwardly of the supporting plate;

FIG. 14, a perspective of the cutting blade shown in FIGS. 11–13.

Briefly, the lawn edge trimming machine of the present invention comprises a tubular bearing housing having upwardly extending struts at the upper end of which a motor is mounted on a base plate with the motor having a drive pulley. A tool carrying shaft is rotatably mounted in bearings in the tubular bearing housing and projects from both ends thereof, carrying a pulley on one end in alignment with the motor pulley. A pair of wheels are rotatably mounted on the tubular housing for supporting the motor, one of the wheels having an elongated hub extending outwardly and carrying a flange at its outer end on which a toothed guarding disk is fixed so that the toothed guarding disk rotates with the wheel having the elongated hub. The other end of the tool carrying shaft has a plate fixed thereon located outwardly of said first toothed guarding disk and carrying a cutter at each end with the cutter at one end on the inner face of the plate and the cutter at the other end on the outer face of the plate. A guard is supported from the chassis formed by the motor and its base plate and embraces the first toothed guarding disk with a guarding sheet located inwardly of the first toothed guarding disk and having a guarding sheet located outwardly of the outer cutter, the outer guarding sheet rotatably supports a second toothed guarding disk for rotation about an axis in alignment with the tool carrying shaft and the guarding sheets are fixed in spaced relation by means of bent-over flange portions and a spade-like prong which extends along the toothed guarding disks with a narrow portion at its free extremity located closely adjacent to but spaced rearwardly from a vertical projection of the axis of the tool carrying shaft. The guarding sheets are provided with a chute which extends upwardly and is open on its outer surface for directing cuttings and other material laterally of the machine so that such cuttings will not contact the operator. A suitable handle is provided for guiding the machine and a belt tightener is operable to connect the motor pulley to the shaft pulley in driving relation. A wiper is provided for contacting the edge of the curb or sidewalk to remove debris therefrom.

Referring more particularly to the drawings, the power driven edger trimming machine of the present invention comprises a tubular bearing housing 15 from which upwardly extending struts 16 support a base plate 17 thereby forming a chassis on which an internal combustion motor 18 is mounted.

The motor 18 carries a driving pulley 19 at one end of its crank shaft while a conventional starting device 20 is mounted on the other end of the crankshaft. A tool carrying shaft 21 is rotatably mounted on bearings 22, 23, and 24 in tubular bearing housing 15 with both ends of the shaft projecting out of the tubular bearing housing. A driven pulley 25 is detachably mounted on one end of the tool shaft 21 by means of a set screw 26 extending against a flattened portion of the shaft while a driving belt 27 extends between driving pulley 19 and driven pulley 25, such belt being of a length to provide for independent movement of the driving and driven pulleys unless the belt is tightened by a belt tightener.

A first ground engaging wheel 28 is rotatably mounted on one end of the tubular bearing housing 15, being retained in position by a flange 29 fixed to the tubular housing 15 and cooperating with a thrust washer 30 engaging the inner end of the hub of wheel 28, the other edge of the hub of the wheel being prevented from outward movement by the hub of the driven pulley 25. A second wheel 31 provided with an elongated tubular hub 32 is rotatably mounted on the other end of the tubular bearing housing. A flange 33 fixed to the other end of the tubular hub 32 of the second wheel 31 removably supports a first toothed guarding disk 34 by means of machine screws 35 passing through the disk and threaded into the flange. The guarding disk 34 has outwardly extending teeth 34A with notches 34B between the teeth. A cutter mounting plate or flange 36 is fixedly mounted on the other end of the tool carrying shaft 21 by welding or the like and carries identical cutter blade elements 37, 37 at each end, the blades being secured to the plate or flange 36 by means of flat headed machine screws 38 passing through counter sunk apertures 39 in the blade 37 and registering apertures 40 in the cutter mounting plate. It will be noted that the cutter blades 37 are mounted on opposite faces of the cutter mounting plate 36 to provide a substantially dynamically balanced cutter blade while permitting the nuts 41 to have sufficient clearance between the inside toothed guarding disk 34 and outside toothed guarding disk 42. It will be noted that the cutting edges 43, 43 of the cutter blades 37 are beveled so that the cutting edges are closely adjacent the toothed guarding disk 34 and 42 to provide a shearing action therebetween as the cutter blade rotates.

A fender like guard 44 is supported from the base plate 17 and includes an inner guard sheet 45 secured by an angle bar 46 to the base plate 17 which guarding sheet 45 is provided with a partial circumferential outwardly extending flange 47. An outer guarding sheet 48 provided with a partial circumferential flange 49 overlying the flange 47 is secured by its flange 49 to flange 47 by a plurality of screws 50 to maintain the outer guarding sheet 48 in operative position. The second toothed guarding disk 42 is freely rotatably mounted on the outer guarding sheet 48 by means of a bolt 51 carrying a bushing 52 and washers to rotatably mount the second toothed guarding disk 42 for rotation on an axis in alignment with the axis of tool carrying shaft 21. An arcuate-shaped prong, including a body portion 53 and a downwardly extending tine 54 is mounted between the rear end portions of the guarding sheets 45 and 48 by means of bolts 55, 56 passing through registering apertures in the guarding sheets and in the prong. It will be noted that the prong extends forwardly and under the toothed guarding disks and cutters and terminates short of the vertical projection of the axis of shaft 21, the tine being of a width to partly cover the width of the cutter blades 37, 37 and to extend over the planes of toothed guarding disks 42, and 34 while the shoulders 57 between the body portion and tine portion of the prong is located substantially at the ground level 65 at the lowermost parts of the wheels 31 and 28 as clearly shown in FIGURES 1, 4, and 5.

The flanges 47 and 49 of the guarding sheets terminate in spaced relation to the upper end of the prong body 53 providing a circumferential opening 58 for the discharge of cuttings from the guard formed by guarding sheets 45 and 48.

To direct such cuttings laterally and to prevent the cuttings from injuring persons, a hollow deflector 59 having a curved inner wall 60, rear wall 61, front wall 62 and a top wall 63 is secured with its inner wall 60 in overlapping relations to the guarding sheet 45 by means of the bolts 55, 56 and/or other fastening elements to maintain the guard deflector in position to effectively direct the cuttings outwardly through the circumferential opening 58 whereby rotation of the cutter in the direction of the arrow 64 will cause the cuttings to be ejected through the circumferential opening 58 and against the increasingly curved inner wall 60 of the deflector 59. The front and rear walls, 62, 61 and the top wall, 63 prevent forceful ejection of the cuttings radially from the blades against an operator or any person in the plane of the cutting blades. It will be noted that the ground level 65 is substantially in the location of the shoulders 57 of the prong and therefore prevents the cuttings from being directed upwardly as they might be forced to the rear, thereby protecting a person to the rear of the machine.

To effectively control the cuttings from remaining on a sidewalk, a wiping brush or wiper 66 of fabric or other suitable material is fixedly mounted by means of a channel, 66-A and a screw, 66-B on the inner guarding sheet 45 in angular relation to serve as a scraper diverging from the path of movement of the machine to wipe a sidewalk or curb 67 clear of cuttings which might be discharged through the teeth of the inner toothed guarding disk 34 onto the sidewalk or curb.

To guide the edging machine, a handle bar 68 is fixedly mounted on rods 69, 69 and connected to rod extensions 70, 70 respectively by suitable removable fasteners 71 for fixedly securing the rods 69 and extensions 70 together. The other ends of extensions 70, 70 are fixed to lugs, 72, 72 by means of other fastener elements passing through registering pairs of apertures. Pivotally mounted on one of the fasteners 73 is a U-shaped frame or stand 74 which is retained in position by a compression spring 75 for maintaining the U-shaped stand in position as shown in the drawings to maintain the handle bar 68 in its operative position, the stand being movable to a raised position permitting manipulation of the machine in any manner desired, the stand automatically being moved out of supporting position upon striking an obstruction.

A belt tightener including a lever 76 pivotally mounted intermediate its ends on the motor 18 by securement to a fender-type inverted J-shaped belt guard 77 is operated by a J-shaped rod 78, pivotally mounted by its short leg to the upper end of the lever 76 and fixed by its longer leg to a rod 79 by a turnbuckle 80 to provide a continuous rod for operation of the belt tightener, the rod, section 79 passing through an aperture in the handle bar 68 and carrying a thumb-engaging button 80 at its upper end adjacent one handle grip whereby a person may depress the button 80, thereby moving the belt tightener lever 76 in a clockwise direction causing the belt tightener pulley 81 at the lower end thereof to engage the adjacent run of the belt 27 to take up slack in the belt and cause the motor 18 to drive the cutter. The inverted J-shaped fender belt guard 77 serves to limit the spread of the belt 27 so the belt 27 will act as a clutch for the drive of the cutter. It will be noted that the construction is such that if the operator lets go of the handles, the belt tightener will be released stopping the cutter, thereby providing an additional safety feature.

In moving the edging machine from place to place the machine is pivoted about the point of contact of wheel 28 with the ground surface 65 so the machine will be at an angle to the ground line 82, indicated by the dotted line 82 whereby the machine may be moved along like a wheelbarrow, the toothed guarding disks 42 and 34 as well as the cutter blades 37 being free from contact with the ground surface and the operator having complete control by means of the handle bar 68.

It will be observed that the tubular bearing housing 15 carrying the bushings, may be supplied with grease by means of a single grease cup 83, mounted on the housing and directing grease thereinto, for effectively lubricating the bearings 22, 23, and 24 of the shaft 21. The hubs of the wheels 31 and 28 are lubricated through aligned apertures 84 and 85 in bearings 23 and 24 and in the tubular housing 15, thereby completely lubricating the moving parts, except for the outside toothed guarding disk 42 which may be lubricated independently in any suitable manner.

It will be observed that the rotatable parts are all independently supported on stationary bearings, thereby avoiding the necessity of friction brakes for preventing rotation of the toothed guarding disks.

Upon reference to FIGURES 9 and 10, another form of cutter is shown mounted on a tool carrying shaft 86, similar to shaft 21, said tool carrying shaft 86 being provided with a flange 87, fixed to the other end of the shaft 86 and carrying an inner cutter disk 88 having cutter blade arms 89, 89 and carrying an outer cutting disk 90 having cutting arms 91, 91, thereby providing a cutter device with four effective blade elements. Since such blade elements can not be radially adjusted replacements may be more expensive. It will be noted that the replacement or adjustment of cutter blades may be readily accomplished by removal of the guarding sheet 48, removal of the driven pulley 25, and withdrawal of the shaft 21 outwardly from the cutter supporting end of the tubular bearing housing. The blades may be replaced or reversed to provide for using the other edges of the cutter blades to increase the useful service obtained therefrom.

It will be noted that the cutting blades 37, 37 are arranged so that they contact different portions of the earth and of the vegetation and even at high speeds the cutters will bite into the earth and into the vegetation since a single blade contacts a particular increment for each revolution of the tool carrying shaft. The modifications of the cutters shown in FIGURES 9 and 10 provide two cutting portions on each cutter disk thereby producing twice the number of cutting actions as with the blades 37. However, in both modifications, the cutting action is effective with proper movement of the machine over the ground in accordance with the speed of rotation of the blade.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. A power driven machine for trimming the edges of cultivated areas comprising a tubular bearing housing, supporting struts extending upwardly from said housing, a base plate fixed to said struts, a motor mounted on said plate, a drive pulley on the shaft of said motor, bearings in each end of said tubular bearing housing, a tool carrying shaft rotatably mounted in said bearings and projecting outwardly from both ends of said tubular bearing housing, a driven pulley detachably mounted on one end of said tool shaft outwardly of one end of said housing in alignment with the drive pulley on said motor, a driving belt extending between said drive pulley and said driven pulley, said motor, tubular bearing housing, struts, and base plate forming a chassis, belt tightening means mounted on said chassis for engaging said belt to take up slack therein to cause said tool carrying shaft to be rotated under power from said motor, a wheel rotatably mounted on the said one end of said bearing housing adjacent said driven pulley for supporting said chassis, a second wheel having an elongated tubular hub spaced from said first wheel away from said one end of the bearing housing, and rotatably mounted on the other end of said tubular bearing housing with the tubular hub extending toward the other end of said housing, a flange fixed to the other end of said tubular hub of said second wheel, a first toothed guarding disk, detachably fixed to said flange to rotate with said second wheel, a cutter mounting plate fixed to the other end of said tool carrying shaft, at least one cutter element secured to said plate and adapted to cooperate with said first toothed guarding disk to provide a shearing action, a guard supported from said chassis and having a guarding sheet located outwardly of said cutter plate and a guarding sheet located inwardly of said cutter plate, means on said outer guarding sheet for supporting a second toothed guarding disk similar to said first toothed guarding disk for free rotation on an axis in alignment with the axis of said tool shaft, said toothed guarding disks being adapted to contact the earth and to rotate as said trimming machine is moved along the earth, a prong mounted on said inner and outer guarding sheets and extending circumferentially downwardly in the trailing portion of said guarding sheets and partially underlying the cutter elements and terminating short of the vertical projections of the axis of the tool shaft whereby the cutters may form a trench and the material loosened by such cutters will follow said prong, a directing chute extending from an upper portion of the trailing part of said guarding sheets and being curved outwardly from said other end of said tool shaft and open towards said other end and having a top projecting outwardly of the plane of said cutter to prevent cuttings from moving radially outward from the cutter, a wiper mounted adjacent said inner guard sheet for contacting a support on which the wheels rest to clean off debris passing inwardly of said first toothed guarding disk and inner sheet, and handle means for guiding and controlling the machine for movement over the ground while supported on said wheels, said machine being adapted to be moved when supported only by the wheel at said one end with the axis of the wheels inclined to the supporting surface to prevent the cutter element and the guarding disks from contacting the earth.

2. A power driven machine for trimming the edges of cultivated areas comprising a tubular bearing housing, supporting struts extending upwardly from said housing, a base plate fixed to said struts, a motor mounted on said plate, a drive pulley on the shaft of said motor, bearings in each end of said tubular bearing housing, a tool carrying shaft rotatably mounted in said bearings and projecting outwardly from both ends of said tubular bearing housing, a driven pulley detachably mounted on one end of said tool shaft outwardly of one end of said housing in alignment with the motor pulley on said motor, a driving belt extending between said motor pulley and said driven pulley, said motor, tubular bearing housing, struts, and base plate forming a chassis, belt tightening means mounted on said chassis for engaging said belt to take up slack therein to cause said tool carrying shaft to be rotated under power from said motor, a first wheel rotatably mounted on the said one end of said bearing housing adjacent said driven pulley for supporting said chassis, a second wheel having an elongated tubular hub spaced from said first wheel away from said one end of the bearing housing, and rotatably mounted on the other end of said tubular bearing housing, with the tubular hub extending toward the other end of said housing, a flange fixed to the other end of said tubular hub of said second wheel, a first toothed guarding disk, detachably fixed to said flange to rotate with said second wheel, a cutter mounting plate fixed to the other end of said tool carrying shaft, at least one cutter element secured to said plate and adapted to cooperate with said first toothed guarding disk to provide a shearing action and means for guiding the machine for movement over the ground.

3. A cutter for trimming a neat edge comprising a chassis, ground engaging means for supporting said chassis, a shaft rotatably mounted on said chassis, a cutter mounted on said shaft, a motor mounted on said chassis and means to drive said shaft from said motor, a guarding sheet on each side of said cutter for confining the cut material therebetween, a prong mounted between said guarding sheets and being located closely adjacent the path of movement of the cutter closely adjacent the ground contacting portion of the ground engaging means for preventing radial projection of cuttings by said cutter, and guiding means extending from said prong and said guarding sheets for directing the cutting in a direction to avoid damage to property and to avoid injury to persons.

4. The invention according to claim 3 in which control means are provided for said drive means between said motor and shaft for controlling the rotation of said shaft.

5. The invention according to claim 3 in which a toothed guarding disk is mounted on at least one side of said cutter for engaging the ground and for cooperation with the cutter.

6. A cutter assembly comprising a shaft, a chassis rotatably supporting said shaft, a plate fixed to said shaft, cutting elements mounted on said plate, a guarding sheet on each side of said cutting elements and supported from said chassis, a disk guard mounted on each side of said plate and between said plate and the adjacent guarding sheet, each guarding disk having radially extending teeth one of said guarding disks being rotatably supported on the adjacent guarding sheet.

7. A lawn edger comprising a chassis, a pair of wheels supporting said chassis, a shaft extending axially through said wheels and rotatively mounted therein, means on the chassis to rotate said shaft, a cutting blade fixed on said shaft outwardly of said wheels, a fender-like guard surrounding said cutter and having a generally arcuate shaped prong extending around a portion of the path of the periphery of the cutting blade with said prong being located on a radius from the axis of said wheels whereby said prong may extend below the surface on which the wheels are supported or may extend above such surface by rotation of said fender-like guard about the axis of said wheels, said fender-like guard having an opening for the lateral projection of material loosened by said cutting blade.

8. The invention according to claim 7, in which a single lubrication means on the housing is provided to lubricate said shaft and wheels.

9. A lawn edger comprising a chassis having a tubular shaft thereon, ground wheels on said tubular shaft, a tool or cutter shaft in said tubular shaft and having vegetation cutting means attached to a terminal portion of said tool or cutter shaft.

10. A lawn edger comprising a chassis having a tubular shaft thereon, ground wheels on said tubular shaft, a tool or cutter shaft in said tubular shaft and having vegetation cutting means attached to a terminal portion of said tool or cutter shaft, a motor mounted on said chassis, drive means between said motor and said tool or cutter shaft whereby said tool or cutter shaft and the cutting means thereon are driven from said motor, and guiding means for directing the movement of said lawn edger.

11. A lawn edger in accordance with claim 10 in which the chassis is supported directly from the tubular shaft and a wheel is located on each side of the support for the chassis.

12. The invention according to claim 10 in which the driving means between the motor and the tool or cutter shaft is a belt drive and a belt tightener is provided for maintaining the belt in driving condition.

13. The invention according to claim 11 in which a guard is arranged to cover the vegetation cutting means and is supported from the chassis, and in which means are provided to extend from the guarding means to deflect the material projected by the vegetation cutting means.

14. A lawn edger comprising a tubular bearing housing, a pair of wheels rotatively mounted on said bearing housing, one of said wheels having an elongated hub projecting toward one end of the housing, a guard disk fixed to said elongated hub in spaced relation to and rotatable with said wheel, said guarding disk being of greater diameter than the wheel, a shaft rotatably mounted in said housing, a cutter mounted on said shaft outwardly of said guarding disk, means to rotate said shaft from the opposite end thereof, a chassis supported from said tubular housing, a fender like guard formed of guarding sheets inwardly and outwardly of said guarding disk and cutter and carried by said chassis, a deflector mounted on the periphery of said guard for directing cuttings laterally and preventing tangential movement of said cuttings, and a second guarding disk mounted on the fender like guard for rotation on an axis substantially in line with the axis of said shaft.

15. The invention according to claim 11 in which the wheel adjacent the cutting means is provided with a tubular hub extending to adjacent the vegetation cutting means, and a guarding disk is mounted on said tubular hub adjacent the cutter for cooperation therewith in the cutting operation and for preventing material engaging the cutter from being projected toward said adjacent wheel.

16. The invention according to claim 10 in which the edger is provided with the guiding means extending transversely of said tubular shaft whereby an operator may guide the machine, guarding sheets extending transversely to said shaft and located on each side of said cutting means, and is provided with means interconnecting said guarding sheets circumferentially of the path of movement of the cutting means, said guarding sheet connecting means including a portion extending substantially to the extremity of the cutter and adapted to lie in the path of the cutter for preventing deflection of material against the operator guiding the machine, and deflecting means extending from said guarding sheet and adapted to project the loosened material away from the operator to a desired location avoiding injury to persons or damage to property.

17. The invention according to claim 10 in which guiding means extend away from said chassis for guiding the edger in use, and means on said guiding means for controlling the operation of the cutting means and of the motor driving said cutting means.

References Cited in the file of this patent

UNITED STATES PATENTS

| | | |
|---|---|---|
| 1,505,685 | Allen | Aug. 19, 1924 |
| 1,883,817 | Olsen et al. | Oct. 18, 1932 |
| 2,521,033 | Bell | Sept. 5, 1950 |
| 2,547,540 | Roberts | Apr. 3, 1951 |
| 2,660,854 | Chadwick | Dec. 1, 1953 |
| 2,664,685 | Phelps | Jan. 5, 1954 |
| 2,690,636 | Besse et al. | Oct. 5, 1954 |
| 2,707,859 | Walker | May 10, 1955 |
| 2,737,003 | Beers | Mar. 6, 1956 |
| 2,760,327 | Bovee | Aug. 28, 1956 |
| 2,767,540 | Corbin | Oct. 23, 1956 |
| 2,767,541 | Yacoby | Oct. 23, 1956 |
| 2,771,730 | True | Nov. 27, 1956 |
| 2,786,322 | McEvers | Mar. 26, 1957 |
| 2,791,082 | McDonough et al. | May 7, 1957 |
| 2,795,916 | Miller | June 18, 1957 |
| 2,826,889 | Menge | Mar. 18, 1958 |
| 2,829,482 | Wadsworth | Apr. 8, 1958 |
| 2,832,184 | Beuerle | Apr. 29, 1958 |
| 2,847,813 | Hanson et al. | Aug. 19, 1958 |